United States Patent [19]

Sakamoto et al.

[11] Patent Number: 5,401,558

[45] Date of Patent: Mar. 28, 1995

[54] BIAXIALLY ORIENTED POLYESTER FILM FOR CAPACITOR DIELECTRIC

[75] Inventors: Seiji Sakamoto, Machida; Kenji Kato, Yokohama, both of Japan

[73] Assignee: Diafoil Hoechst Co., Ltd., Tokyo, Japan

[21] Appl. No.: 44,089

[22] Filed: Apr. 6, 1993

Related U.S. Application Data

[63] Continuation of Ser. No. 830,413, Feb. 4, 1992, abandoned.

[30] Foreign Application Priority Data

Feb. 7, 1991 [JP] Japan ................ 3-016604

[51] Int. Cl.$^6$ ............ B32B 5/16; B32B 27/36; H01G 4/18; H01G 4/24
[52] U.S. Cl. ................ 428/141; 361/311; 361/323; 428/147; 428/220; 428/327; 428/332; 428/480; 428/910
[58] Field of Search ............ 361/311, 323; 428/141, 428/147, 220, 332, 327, 480, 910

[56] References Cited

U.S. PATENT DOCUMENTS

| | | |
|---|---|---|
| 4,568,616 | 2/1986 | Seifried et al. ............ 428/480 |
| 4,687,699 | 8/1987 | Hensel et al. ............ 428/480 |
| 4,687,700 | 8/1987 | Hensel et al. ............ 428/480 |
| 4,767,657 | 8/1988 | Sakamoto et al. ............ 428/480 |
| 4,814,221 | 3/1989 | Utsumi ............ 428/480 |
| 5,032,458 | 7/1991 | Dallmann et al. ............ 428/480 |
| 5,069,962 | 12/1991 | Okazaki et al. ............ 428/480 |
| 5,100,719 | 3/1992 | Endo et al. ............ 428/480 |

FOREIGN PATENT DOCUMENTS 0225631  6/1987  European Pat. Off. .

OTHER PUBLICATIONS

World Patents Index Latest, Section Ch, Week 9111, Derwent Publications Ltd., Class A, AN 91-077310 & JA-A-3 023-923 (Toray and Inc) 31 Jan. 1991 Abstract.

*Primary Examiner*—D. S. Nakarani
*Attorney, Agent, or Firm*—David G. Conlin; George W. Neuner; Kevin J. Fournier

[57] ABSTRACT

A biaxially oriented polyethylene-2,6-naphthalate (PEN) film for capacitor dielectric which contains the specific monodisperse cross-linked polymer particles is described. The capacitors using the PEN film have excellent handling qualities and workability as well as excellent electrical properties.

6 Claims, No Drawings

BIAXIALLY ORIENTED POLYESTER FILM FOR CAPACITOR DIELECTRIC

This is a continuation of copending application(s) Ser. No. 07/830,413 filed on Feb. 4, 1992, now abandoned.

BACKGROUND OF THE INVENTION

The present invention relates to a biaxially oriented polyethylene-2,6-naphthalate film for capacitor dielectric.

With miniaturization of electric and electronic devices, necessity is noted for reduction in thickness of plastic film for capacitor dielectric.

Polyethylene terephthalate film and polypropylene film have been predominantly used in this field, but attention has focused recently on polyethylene-2,6-naphthalate (hereinafter abbreviated as PEN) film for its high heat resistance, high mechanical strength and easiness of reduction of thickness.

PEN film, however, has the problem that when the film thickness is reduced, especially when it is reduced to 2.0 $\mu$m or less, the slip characteristics of the film become lower and work ability is deteriorated. For solving this problem, a method is employed in which fine particles are blended in the film. However, the presence of such particles in the film often leads to deterioration of electric properties of the film.

Generally, inorganic particles have poor compatibility with polyethylene-2,6-naphthalate, so that when the film is stretched, large voids are created around the particles to deteriorate the dielectric strength of the film. Also, surface roughness of the film often becomes excessively coarse, causing a reduction of electrostatic capacity of the capacitor.

SUMMARY OF THE INVENTION

In view of said circumstances, the present inventors have made extensive studies on PEN film for capacitor dielectric which is excellent in both slip characteristics and electrical properties, and as a result have found that a film containing a certain amount of crosslinked polymer particles having a specific average particle size and a specific particle size distribution can well satisfy said property requirements. The present invention has been accomplished based on this finding.

Thus, the characteristic feature of the present invention resides in a biaxially oriented polyethylene-2,6-naphthalate film for capacitor dielectric which contains monodisperse cross-linked polymer particles, the film having a center line averaged surface roughness of 0.01 to 0.4 $\mu$m and a thickness of 2 $\mu$m or below, and the ratio of the weight-average particle size of the crosslinked polymer and the film thickness being in the range from 0.1 to 0.6.

DETAILED DESCRIPTION OF THE INVENTION

The present invention is described in further detail below.

PEN referred to in the present invention designates the polymers which are constituted substantially from ethylene-2,6-naphthalate units, but PEN may have a small portion, for example 10 mol % or less, of other units as a third component. PEN can be usually obtained by polycondensing naphthalene-2,6-dicarboxylic acid or its ester-forming alkyl ester with ethylene glycol in the presence of a catalyst under appropriate reaction conditions. As the third component, there can be mentioned, for example, adipic acid, sebacic acid, terephthalic acid, naphthalene-2,7-dicarboxylic acid, tetramethylene glycol, hexamethylene glycol and polyethylene glycol. The intrinsic viscosity ($[\eta]$)of PEN is preferred to be in the range from 0.5 to 0.8.

The polyester film (PEN film) according to the present invention refers to a biaxially oriented film which can be formed by biaxially stretching PEN as the starting material by the known method. That is, PEN is dried, melt extruded at 280° to 320° C. quenched and solidified to obtain a substantially amorphous non-oriented sheet, then the amorphous non-oriented sheet is stretched 2 to 5 times in the machine direction at 120° to 170° C. and further stretched 2 to 5 times in the transverse direction at 120° to 180° C. The thus obtained biaxially stretched film is subjected to a heat treatment at 150° to 250° C. The stretching and heat treatment operations may be carried out in multiple stages as desired. Also, relaxation during the heat treatment and re-stretching may be employed.

The polyethylene-2,6-naphthalate films referred to in the present invention are those obtained in the manner described above and have a thickness of 2.0 $\mu$m or less, preferably 0.2 to 2.0 $\mu$m. It has been extremely difficult to obtain such thin films which sufficiently satisfy the slip characteristics, mechanical properties and electrical properties in the prior art technique, but the present inventors have succeeded in resolving this difficulty by blending specific organic particles in the film.

In the present invention, there are used monodisperse crosslinked polymer particles. The "monodisperse" referred to herein means that the ratio of weight-average particle size to number-average particle size of the crosslinked polymer particles is 1.15 or less, preferably 1.10 or less, more preferably 1.05 or less.

The "crosslinked polymer particles" referred to herein designate the heat-resistant organic particles synthesized by so-called emulsion polymerization. Such particles are usually produced by using as starting materials one or more of monovinyl compounds (A) having only one aliphatic unsaturated bond in the molecule and one or more of compounds (B) having two or more aliphatic unsaturated bonds in the molecule which act as the crosslinking agent. The monovinyl compound (A) may include acrylic acid, methacrylic acid, alkyl acrylate, alkyl methacrylate, glycidyl acrylate, glycidyl methacrylate, maleic anhydride, alkyl maleate, vinyl glycidyl ether, vinyl acetate, styrene and alkyl-substituted styrene. The compounds (B) may include divinylbenzene, divinylsulfone and ethylene glycol dimethacrylate. At least one of said compounds (A) and at least one of said compounds (B) are used, and it is possible to copolymerize therewith a compound having nitrogen atom or ethylene.

The emulsion polymerization referred to herein includes not only typical emulsion polymerization in which a sufficient amount of an emulsifier for forming critical micelle concentration is used, but also other types of emulsion polymerization such as soap-free polymerization using a very small amount of emulsifier, seed polymerization in which the particles are added as nucleus in the reaction system prior to emulsion polymerization, and core-shell polymerization in which emulsion polymerization is carried out in multiple stages by changing the monomer composition.

The crosslinked polymer particles may exist in the film in a somewhat deformed state depending on the degree of crosslinking and the stretching conditions during the film formation. The average particle size of such deformed particles was expressed by calculated value by means of the equivalent sphere method.

The weight-average particle size of the crosslinked polymer particles is in the range of 0.1 to 0.6 times, preferably 0.2 to 0.5 times the film thickness. If the weight-average particle size is less than 0.1 times the film thickness, no satisfactory improvement in slip characteristics is obtained, and if it exceeds 0.6 times the film thickness, there may result a reduction in electrostatic capacity or deterioration in dielectric strength.

The center line averaged surface roughness of the PEN film is in the range of 0.01 to 0.4 $\mu$m, preferably 0.03 to 0.3 $\mu$m. This value is chiefly dependent on the average particle size of the particles to be blended, the blending amount thereof and degree of deformation of the particles. If this value is less than 0.01 $\mu$m, the handling workability is deteriorated, while if it exceeds 0.4 $\mu$m, although the slip characteristics of the film are good, the electrical properties are deteriorated. For satisfying these requirements, usually the amount of the monodisperse crosslinked polymer particles to be added to the polyester is in the range from 0.05 to 1 wt % based on the amount of the polyester. The monodisperse crosslinked polymer particles may be added in any stage during the production of PEN or during the production of. PEN film.

Particles other than the monodisperse crosslinked polymer particles, for example, particles of an inorganic substance such as kaolin, calcium carbonate, calcium phosphate, silicon oxide, titanium oxide and the like can be added to the PEN film in a small amount such as 20 wt % or less, preferably 10 wt % or less based on the amount of the monodisperse crosslinked polymer particles.

As described above in detail, according to the present invention, the polyester film having excellent properties which has been unable to obtain in the prior art can be obtained by using the monodisperse crosslinked organic particles as defined above. The effect of the present invention is more remarkable especially in the polyethylene-2,6-naphthalate film having a thickness of 2.0 $\mu$m or less in which the sum of the initial modulus in the machine and transverse directions is 1,100 kg/mm$^2$ or greater, more especially 1,200 kg/mm$^2$ or greater. For obtaining a film having such a high modulus, it is necessary to give strong orientation to the film, but in the case of a film containing inorganic particles, there are often created larger voids around the inorganic particles to deteriorate the electrical properties. According to the present invention, however, such a phenomenon can be avoided and a film having the desired properties can be obtained.

The PEN film of the present invention is made into a capacitor by the known methods in the art. For example, a metallized film capacitor is produced as follows. After a metallized film is slitted to a given width, for example 15 mm, two slitted metallized films are put together with the respective non-metallized portions situated on the opposite sides and is wound up together to be a capacitor element by using an element winder. The thus obtained capacitor element is pressed to be flat, then, both the end surfaces of the flat capacitor element are subjected to metallikon and soldering of lead wires, and finally, the thus treated capacitor element is provided, if necessary, with an outer container to obtain a metallized film capacitor.

The present invention will hereinafter be described more specifically by showing the examples thereof, but it is to be understood that these examples are merely intended to be illustrative and the present invention is not limited to the examples.

In the following Examples and Comparative Examples, "parts" are by weight unless otherwise noted.

The methods of determination and definition of various properties and characteristics are as described below.

(1) Average particle size of the particles and particle size distribution

The particle diameters were measured by an electron microscope. The diameter at the point of 50% in weight fraction on the cumulative distribution curve of the particles obtained by equivalent sphere method was given as the weight-average particle size (Dw). The number-average particle diameter (Dn) was also determined and the ratio (Dw/Dn) was given as the index of the particle size distribution (degree of monodisperse).

(2) Film surface roughness and its uniformity 10-point average roughness (Rz) and center line averaged surface roughness (Ra) were determined according to the method described in JIS B0601. The film surface uniformity is expressed by Rz/Ra. The smaller the value, the better.

(3) Running properties

The film to be tested was contacted with a fixed hard chrome-plated metal pin (6 mm in diameter) at a contact angle of 135°. With a load of 53 g applied to one end of the film, the film was let run at a speed of 1 m/min to measure the resisting force at the other end of the film. The coefficient of friction of the film was determined according to the Euler's equation and shown as a measure of running properties of the film.

(4) Capacitor capacity

Aluminum was deposited on the film by a vacuum depositing device, and then the film was slit so that the deposited portion would have a width of 10 mm. Two pieces of 2-meter long slit tape having different non-deposited margins were piled and wound together, followed by end sealing and attachment of lead wires to form a capacitor element. Electrostatic capacity of this capacitor element was measured by using RLc Digibridge made by General Radio Inc. in an atmosphere of 23° C. and 50% RH under the conditions of 1KHz and 0.3 Vrms.

(5) Determination of dielectric strength

A 100 kV DC dielectric strength tester was used. The electrode ends of the capacitor element obtained in (4) above were connected to the voltage applying electrode and the earthing electrode of said tester by clips. The voltage of the tester was raised at a rate of 100 V/sec, and the voltage at which the capacitor was broken to cause short-circuiting was read.

EXAMPLE 1

[Production of crosslinked polymer particles]

50 parts of ethylene glycol dimethacrylate, 35 parts of methyl methacrylate and 15 parts of divinylbenzene were subjected to soap-free polymerization in water by using potassium persulfate as polymerization initiator and sodium laurylsulfate as dispersion stabilizer to obtain crosslinked polymer particles.

The obtained particles had a weight-average diameter (Dw) of 0.61 $\mu$m and a number-average diameter (Dn) of 0.59 $\mu$m, the Dw/Dn ratio being 1.03, which indicates excellent monodisperse of the particles.

[Preparation of polyethylene-2,6-naphthalate]

100 parts of dimethyl naphthalene-2,6-dicarboxylate and 65 parts of ethylene glycol were subjected to ester interchange reaction according to a conventional method by using magnesium acetate as the catalyst. Then, 0.5 part of the previously obtained crosslinked polymer particles were added. Then, after further adding antimony trioxide as polycondensation catalyst, the mixture was subjected to polycondensation reaction according to a conventional method to obtain a polymer having an intrinsic viscosity of 0.55. The obtained polymer was further subjected to solid phase polymerization to finally obtain polyethylene-2,6-naphthalate having an intrinsic viscosity of 0.63.

[Production of polyester film]

The obtained polymer was extruded into a form of sheet by an extruder at 295° C. and made into an amorphous sheet by using the electrostatic cooling method. This sheet was then stretched 4.0 times in the machine direction at 130° C. and 3.8 times in the transverse direction at 132° C., after which the sheet was re-stretched 1.10 times in the machine direction at 134° C. The stretched film was subjected to heat treatment at 220° C. for 3 seconds to obtain a biaxially oriented polyethylene-2,6-naphthalate film having a thickness of 1.3 μm. Initial modulus of the thus obtained film was 670 kg/mm$^2$ in the machine direction and 570 kg/mm$^2$ in the transverse direction.

The properties of the polyester films obtained in the manner described above and the electrical properties of the capacitors made by using the polyester film are shown in Table 1. Both the film properties and electrical properties were well satisfactory.

EXAMPLE 2

A 1.3 μm thick biaxially oriented polyethylene-2,6-naphthalate film was obtained in the same manner as in Example 1 except for using the crosslinked polymer particles as specified in Table 1.

EXAMPLE 3

A polyester film was obtained in the same manner as in Example 1 except for using the crosslinked polymer having the composition of styrene/methyl methacrylate/divinylbenzene =60/20/20 and the particle sizes as specified in Table 1.

Comparative Examples 1–4

Polyethylene-2,6-naphthalate films were obtained in the same manner as in Example 1 using each of the particles as shown in Table 1. The composition of the crosslinked polymer was styrene/methyl methacrylate/divinylbenzene=40/40/20 in Comparative Example 1, and styrene/divinylbenzene=85/15 in Comparative Example 2.

TABLE 1

| Examples or Comparative Examples | Inactive particles added | | | | | Film properties | | | | Electrical propeties | |
|---|---|---|---|---|---|---|---|---|---|---|---|
| | Type | Dw (μm) | Dn (μm) | Dw/Dn | Content (wt %) | Dw/film thickness | Friction coefficient | Ra (μm) | Rz/Ra | Capacity (μF) | Dielectric strength (kv) |
| Example 1 | Crosslinked polymer | 0.61 | 0.59 | 1.03 | 0.5 | 0.43 | 0.65 | 0.06 | 9.2 | 0.62 | 0.78 |
| Example 2 | Crosslinked polymer | 0.42 | 0.40 | 1.05 | 0.5 | 0.32 | 0.60 | 0.05 | 9.4 | 0.64 | 0.82 |
| Example 3 | Crosslinked polymer | 0.37 | 0.36 | 1.03 | 0.7 | 0.28 | 0.59 | 0.06 | 9.1 | 0.65 | 0.76 |
| Comp. Example 1 | Crosslinked polymer | 0.08 | 0.07 | 1.14 | 0.5 | 0.06 | 0.96 | 0.01 | 11.3 | 0.66 | 0.81 |
| Comp. Example 2 | Crosslinked polymer | 1.0 | 0.97 | 1.03 | 0.5 | 0.77 | 0.46 | 0.08 | 9.3 | 0.50 | 0.70 |
| Comp. Example 3 | Kaolin | 0.51 | 0.39 | 1.31 | 0.5 | 0.39 | 0.72 | 0.07 | 15.6 | 0.52 | 0.62 |
| Comp. Example 4 | Calcium carbonate | 0.61 | 0.42 | 1.45 | 0.3 | 0.47 | 0.85 | 0.07 | 16.8 | 0.52 | 0.59 |

What is claimed is:

1. A dielectric capacitor film consisting essentially of biaxially oriented polyethylene-2,6-naphthalate which contains monodisperse cross-linked polymer particles, the film having a center line average surface roughness of 0.01 to 0.4 μm and a thickness of 2 μm or below, and the ratio of the weight-average particle size of the cross-linked polymer to the film thickness being in the range from 0.1 to 0.6.

2. A dielectric capacitor according to claim 1, wherein the monodisperse cross-linked polymer particles are contained in the film in an amount of 0.05 to 1% by weight based on the polyethylene-2,6-naphthalate.

3. A dielectric capacitor according to claim 1, wherein the ratio of the weight-average particle size to the number-average particle size is 1.15 or less.

4. A dielectric capacitor according to claim 1, wherein the monodisperse cross-linked polymer particles are produced by subjecting a mixture comprising at least one monovinyl compound and at least one compound having two or more aliphatic unsaturated bonds in the molecule to emulsion polymerization.

5. A dielectric capacitor according to claim 4, wherein the monovinyl compound is selected from the group consisting of acrylic acid, methacrylic acid, alkyl acrylate, alkyl methacrylate, glycidyl acrylate, glycidyl methacrylate, vinyl glycidyl ether, vinyl acetate, styrene and alkyl-substituted styrene.

6. A dielectric capacitor according to claim 4, wherein the compound having two or more aliphatic unsaturated bonds in the molecule is selected from the group consisting of divinylbenzene, divinylsulfone and ethylene glycol dimethacrylate.

* * * * *